(12) United States Patent
Fröschle et al.

(10) Patent No.: US 7,922,234 B2
(45) Date of Patent: Apr. 12, 2011

(54) REAR LID

(75) Inventors: Mathias Fröschle, Ostfildern (DE);
Markus Schulzki, Ludwigsburg (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 276 days.

(21) Appl. No.: 12/108,775

(22) Filed: Apr. 24, 2008

(65) Prior Publication Data

US 2008/0315613 A1 Dec. 25, 2008

(30) Foreign Application Priority Data

Jun. 20, 2007 (DE) .......................... 10 2007 028 163

(51) Int. Cl.
*B62D 25/12* (2006.01)
(52) U.S. Cl. ..................... 296/180.1; 296/180.5; 296/56; 29/897.2
(58) Field of Classification Search ............... 296/180.1, 296/180.3, 180.5, 181.5, 56, 146.8, 76; 180/403; 29/897.2

See application file for complete search history.

(56) References Cited

U.S. PATENT DOCUMENTS

| | | | | |
|---|---|---|---|---|
| 4,887,681 A * | 12/1989 | Durm et al. | .................. | 180/68.1 |
| 4,889,382 A | 12/1989 | Burst et al. | | |
| 5,074,612 A * | 12/1991 | Liese et al. | .................. | 296/180.5 |
| 5,120,105 A * | 6/1992 | Brin et al. | .................. | 296/180.5 |
| 5,923,245 A | 7/1999 | Klatt et al. | | |
| 6,170,904 B1 * | 1/2001 | Schaedlich et al. | ........ | 296/180.1 |
| 6,382,708 B1 * | 5/2002 | Erdelitsch et al. | .......... | 296/180.5 |
| 6,679,545 B1 * | 1/2004 | Balzer et al. | .............. | 296/193.09 |
| 7,111,898 B2 * | 9/2006 | Rinklin | ........................ | 296/180.1 |
| 7,387,330 B2 * | 6/2008 | Froeschle et al. | .......... | 296/180.5 |
| 7,481,482 B2 * | 1/2009 | Grave et al. | ................. | 296/180.5 |
| 7,665,796 B2 * | 2/2010 | Wegener | ..................... | 296/180.1 |
| 2007/0145776 A1 * | 6/2007 | Grave et al. | ................. | 296/180.5 |
| 2007/0228772 A1 | 10/2007 | Froeschle et al. | | |
| 2008/0211261 A1 * | 9/2008 | Wegener | ..................... | 296/180.5 |
| 2009/0160213 A1 * | 6/2009 | Paul et al. | .................... | 296/180.1 |
| 2009/0160215 A1 * | 6/2009 | Paul et al. | .................... | 296/180.5 |
| 2010/0026044 A1 * | 2/2010 | Ramin et al. | ............... | 296/180.1 |

FOREIGN PATENT DOCUMENTS

| | | |
|---|---|---|
| DE | 3615584 A1 | 11/1987 |
| DE | 19652692 C1 | 6/1998 |
| DE | 20 2005 018 050 U1 | 4/2006 |
| DE | 10 2006 017 522 A1 | 10/2007 |
| EP | 0 250 716 B1 | 1/1988 |
| EP | 1840015 A1 | 10/2007 |

OTHER PUBLICATIONS

European Search Report dated May 14, 2009.

* cited by examiner

*Primary Examiner* — Jason S Morrow

(57) ABSTRACT

A rear lid closes a rear compartment of a passenger vehicle. The rear lid, when fitted, is attached to the vehicle and is composed of an inner part and an outer part. The rear lid contains a spoiler device which can be displaced between an inoperative position and an operative position and interacts with an adjustment device. In order to simplify producibility of the rear lid, the inner part is formed by an assembly carrier which forms the supporting structure of the rear lid and to which at least the adjustment device of the spoiler device is fastened. The outer part is formed by the spoiler device and a panel device.

13 Claims, 3 Drawing Sheets

REAR LID

CROSS-REFERENCE TO RELATED APPLICATION

This application claims the priority, under 35 U.S.C. §119, of German application DE 10 2007 028 163.5, filed Jun. 20, 2007; the prior application is herewith incorporated by reference in its entirety.

BACKGROUND OF THE INVENTION

Field of the Invention

The present invention relates to a rear lid for closing a rear compartment of a passenger vehicle. The rear lid, when fitted, being attached to the vehicle and being composed of an inner part and an outer part. The rear lid contains a spoiler device which can be displaced between an inoperative position and an operative position and interacts with an adjustment device.

European patent EP 0 250 716 B1 discloses a rear lid which contains a lid body of shell-type construction, with an inner shell which faces the rear compartment which is to be closed and with an outer shell which faces away from the rear compartment and completely covers or clads the inner shell. The lid body contains a cutout which is enclosed on all sides and in which a spoiler device is disposed. The latter is attached to the lid body in a manner such that it can be adjusted between an inoperative position and an operative position. Furthermore, an adjustment device is provided for adjusting the spoiler device which is attached to the inner shell and therefore to the lid body via an auxiliary frame. The production of a vehicle which has a rear compartment and a rear lid of this type can be carried out, for example, in such a manner that first of all the lid body, i.e. the inner shell and the outer shell which is fastened thereto are fastened to the vehicle body via hinges. The vehicle body together with the lid body attached thereto is subsequently painted. After the painting, the remaining components of the rear lid, i.e. in particular the spoiler device and the adjustment device and, if appropriate, a fan and a locking clamp, are attached to the lid body.

SUMMARY OF THE INVENTION

It is accordingly an object of the invention to provide a rear lid that overcomes the above-mentioned disadvantages of the prior art devices and methods of this general type, which is distinguished in particular by simplified producibility.

With the foregoing and other objects in view there is provided, in accordance with the invention, a rear lid for closing a rear compartment of a passenger vehicle, the rear lid, when fitted, being attached to the passenger vehicle. The rear lid contains an inner part being an assembly carrier forming a supporting structure of the rear lid; an adjustment device fastened to the assembly carrier; and an outer part having a panel device and a spoiler device. The spoiler is displaced by the adjustment device between an inoperative position and an operative position.

The invention is based on the general concept of equipping the rear lid with a self-supporting assembly carrier to which all of the remaining components of the rear lid are fitted. A preassemblable unit is thereby formed, which simplifies the production of the vehicle equipped with the rear lid. In particular, the unit which is preassembled in this manner can be fitted to the already painted vehicle body. In order to be able better to adapt the visual impression of the rear lid here to the painted vehicle body, the spoiler device extends over the entire width of the rear lid, as measured transversely with respect to the longitudinal direction of the vehicle. The spoiler device therefore covers the outer side of the assembly carrier over the entire width, and therefore painting of the assembly carrier is not required. The remaining region of the outer side of the assembly carrier is covered in this case by a panel device which likewise extends over the entire width of the rear lid.

This construction results in a further simplification of the assembly, since the spoiler device, when fitted, only has to be aligned in relation to the vehicle body in order to produce the desired gap sizes. In the case of the known rear lid which is described further above, the spoiler device has to be aligned in relation to the lid body. In addition, the lid body has to be aligned in relation to the vehicle body in order to obtain the desired gap sizes.

According to a particularly advantageous embodiment, the panel device can have a panel carrier which is fastened to the assembly carrier, and at least one panel body which is fastened to an outer side of the panel carrier, which outer side faces away from the assembly carrier. The use of different panel bodies therefore enables different variants of the panel device to be realized. The panel carrier remains identical, as a result of which the diversity of parts can be reduced and the costs for forming variants can be lowered.

In accordance with an added feature of the invention, at least one of the panel bodies is configured as a luminous band.

In accordance with an additional feature of the invention, the adjustment device is directly fastened to the assembly carrier. In addition, a fan is directly fastened to the assembly carrier. Furthermore, a locking clamp is directly fastened to the assembly carrier. Hinges are also directly fastened to the assembly carrier.

In accordance with another feature of the invention, the assembly carrier is a single-piece diecast part made from a metal alloy such as aluminum or magnesium alloy.

With the foregoing and other objects in view there is provided, in accordance with the invention, a method for producing a passenger vehicle with a tailgate. The methods includes the steps of preassembling an adjustment device on an assembly carrier resulting in a preassembled assembly carrier; fitting the preassembled assembly carrier to a painted vehicle body; and fitting a spoiler device to the preassembled assembly carrier fitted to the painted vehicle body.

In accordance with a concomitant mode of the invention, during the preassembling of the assembly carrier step, there is the step of fitting at least one of a panel device, a panel carrier, panel bodies, a fan, a locking clamp and hinges to the assembly carrier.

It goes without saying that the features mentioned above and those which have yet to be explained below can be used not only in the respectively stated combination but also in different combinations or on their own without departing from the scope of the present invention.

Other features which are considered as characteristic for the invention are set forth in the appended claims.

Although the invention is illustrated and described herein as embodied in a rear lid, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The same reference numbers

DETAILED DESCRIPTION OF THE INVENTION

Figure 1:
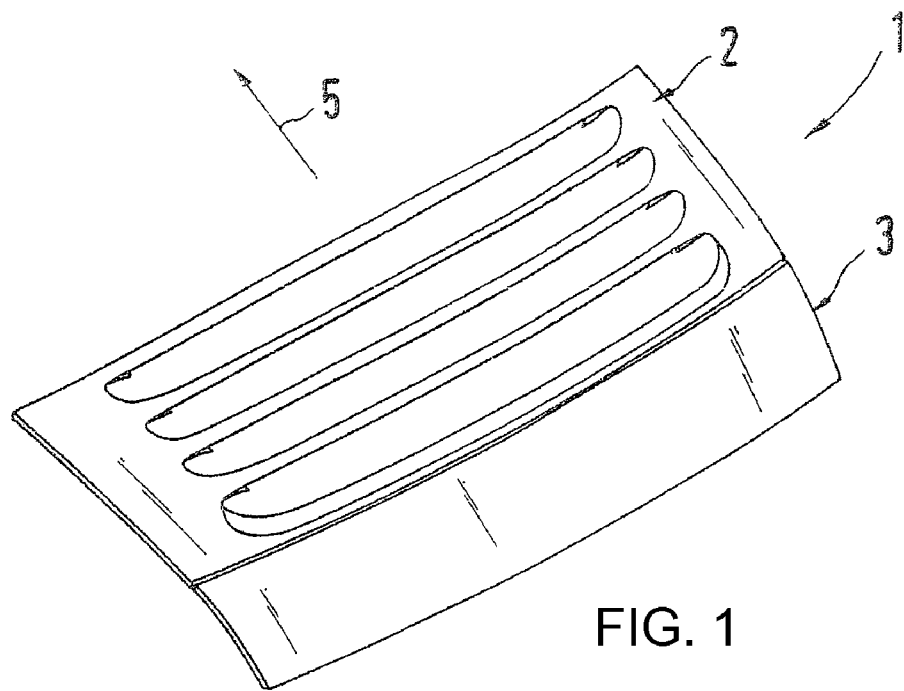
FIG. 1 is a diagrammatic, perspective view of a rear lid according to the invention.
Figure 2:
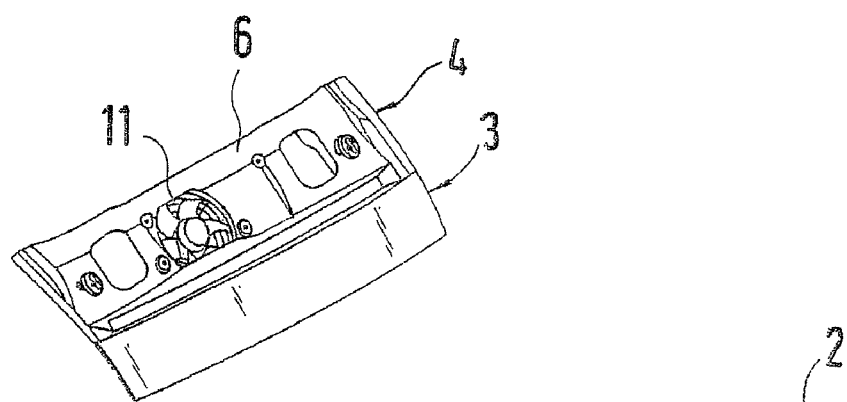
FIG. 2 is a diagrammatic, perspective view of the rear lid without a spoiler device.
Figure 3:
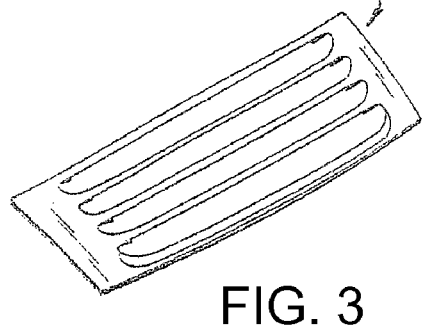
FIG. 3 is a diagrammatic, perspective view of the spoiler device.

Referring now to the figures of the drawing in detail and first, particularly, to FIGS. 1-3 thereof, there is shown a rear lid 1, with the aid of which a non-illustrated rear compartment of a passenger vehicle, in particular a sports car, can be closed. The rear lid contains a spoiler device 2, a panel device 3 and an assembly carrier 4 which can be seen in FIG. 2. The assembly carrier 4 forms, as it were, an inner side of the rear lid 1, which inner side, when the rear lid 1 is fitted, faces the rear compartment which is to be closed. In contrast thereto, the spoiler device 2 and the panel device 3 form an outer side of the rear lid 1, which outer side, when the rear lid is fitted, faces away from the rear compartment. As can be seen, the spoiler device 2 and the panel device 3 each extend over the entire width of the rear lid 1, as measured transversely with respect to a longitudinal direction 5 of the vehicle, which direction is illustrated symbolically in FIG. 1 by an arrow.

Furthermore, the panel device 3 is disposed on a rear side, i.e. to the rear with respect to the direction of travel of the vehicle, adjacent to the spoiler device 2 on the assembly carrier 4. However, the panel device 3 may also be disposed in front of the spoiler device 2.

In the fitted state, the assembly carrier 4 is attached to the vehicle in a manner such that it can be pivotably adjusted. For this purpose, non-illustrated hinges are attached to the assembly carrier 4. The assembly carrier 4 has an outer side 6 which, in the fitted state, faces away from the rear compartment and, in FIGS. 2, 10 and 11, faces an observer. The assembly carrier 4 may be produced as a cast component. For example, it may here be a diecast part made from a light metal alloy, preferably from an aluminum or magnesium alloy. Similarly, the assembly carrier 4 may be configured as a plastic injection molded component or as a pressed component. Furthermore, it is possible to configure the assembly carrier 4 as a sheet-metal shaped part, preferably made from a light metal sheet.

Figure 4:
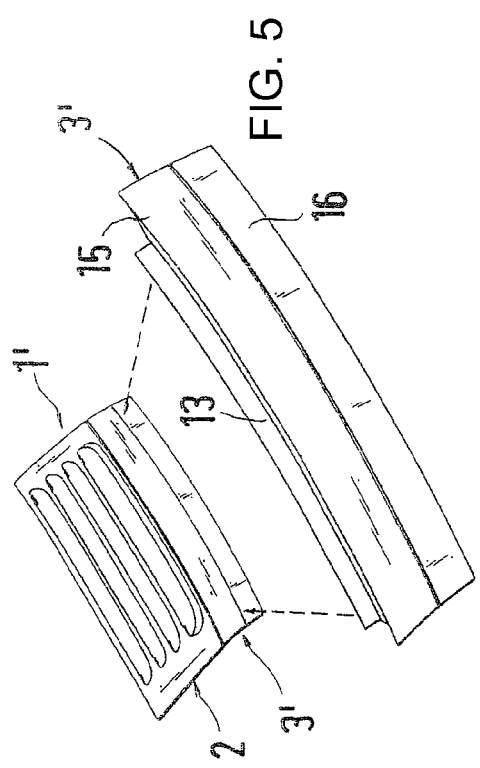
FIG. 4 is a diagrammatic, perspective view of the rear lid with a panel device pulled out and enlarged.
Figure 5:
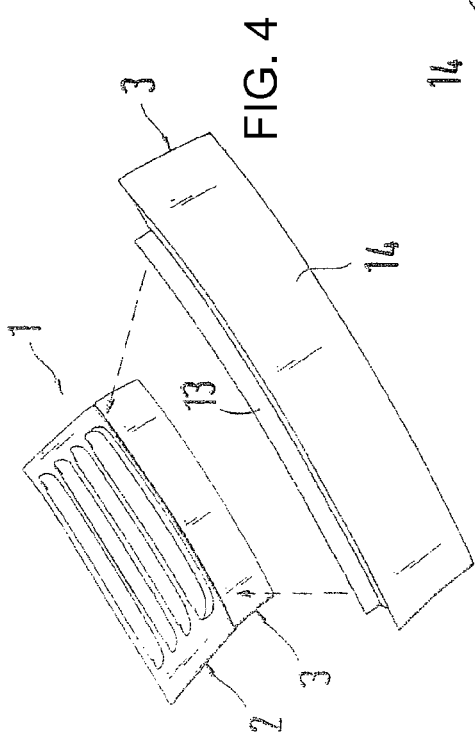
FIG. 5 is a diagrammatic, perspective view as shown in FIG. 4, but with a different embodiment of the panel device.
Figure 14:
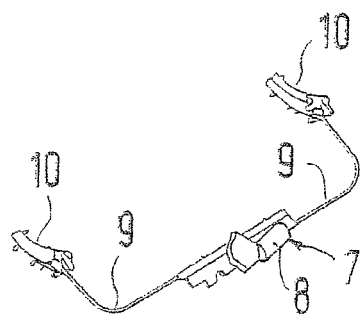
FIG. 14 is an illustration of an adjustment device.

The spoiler device 2 is disposed on the outer side 6 of the assembly carrier 4, to be precise in such a manner that it can be adjusted between an inoperative position, shown in FIGS. 1, 4 and 5, and an operative position. In the inoperative position, the spoiler device 2 is integrated into the contour of the rear lid 1 and, when the rear lid 1 is closed, into the contour of the vehicle body. In the operative position, the spoiler device 2 is deployed. For example, the spoiler device 2 extends essentially horizontally in its operative position on the vehicle when the rear lid 1 is closed. The spoiler device 2 forms a spoiler in its operative position. In order to be able to adjust the spoiler device 2 between the inoperative position and the operative position, an adjustment device 7 (illustrated in FIG. 14) which is likewise attached to the assembly carrier 4 is provided. The adjustment device 7 can have, for example, an adjustment drive 8 which is coupled via suitable connecting elements 9, such as, for example, Bowden cables or flexible rotary shafts, to actuating elements 10 to which the spoiler device 2 is fixedly connected.

The spoiler device 2 has, in the customary manner, air inlet openings (not referred to specifically) in order to be able to introduce air through the spoiler device 2 and through the rear lid 1 into the rear compartment in which, for example, a driving unit of the passenger vehicle may be disposed. In this case, the assembly carrier 4 has at least one passage opening 11. In the example shown, the assembly carrier 4 has at least three relatively large passage openings 11. Furthermore, a fan 12 which makes the desired circulation of air possible is fastened here to the assembly carrier 4. In this case, the fan 12 is fastened directly to the assembly carrier 4 and is disposed on an inner side of the assembly carrier 4, which inner side faces the rear compartment.

Since both the spoiler device 2 and the panel device 3 extend over the entire width of the assembly carrier 4, the latter is completely covered on its outer side 6 by the spoiler device 2 and by the panel device 3 at least in the inoperative position of the spoiler device 2. Painting of the assembly carrier 4 in line with the color of the vehicle body is therefore not required.

The panel device 3 is configured in such a manner that it can be produced as simply as possible in a plurality of variants in order also to be able to realize different variants of the rear lid 1. Accordingly, FIG. 4 shows the variant, which is already shown in FIGS. 1 to 3, of the rear lid 1 and of the panel device 3 while FIG. 5 shows a different embodiment of the rear lid 1 which is referred to below by 1', and of the panel device 3, which is referred to below by 3'. According to FIGS. 3 to 9, the panel device 3 or 3' contains a panel carrier 13 which is fastened to the assembly carrier 4, to be precise to the outer side 6 thereof. Furthermore, the panel device 3 or 3' contains at least one panel body 14 or 15 and 16. In the embodiment shown in FIG. 4, only one panel body 14 is provided. In contrast thereto, the embodiment reproduced in FIG. 5 shows two panel bodies 15 and 16. The particular panel body 14, 15, 16 is fastened to the panel carrier 13 on an outer side 17 which faces away from the assembly carrier 4.

Figure 7:
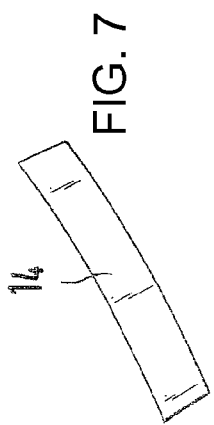
FIG. 7 is a diagrammatic, plan view view of a panel body for the panel device shown in FIG. 4.

FIG. 7 shows the one panel body 14 which is used in order to realize the embodiment shown in FIG. 4. The single panel body 14 used in this case extends over the entire width of the rear lid 1 and, as a result, clads the entire panel carrier 13 and that section of the assembly carrier 4 which is assigned to the panel device 3.

Figure 8:
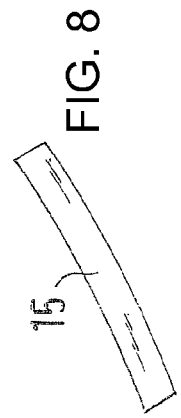
FIGS. 8 and 9 are diagrammatic, plan views of panel bodies for the panel device shown in FIG. 5.
Figure 9:
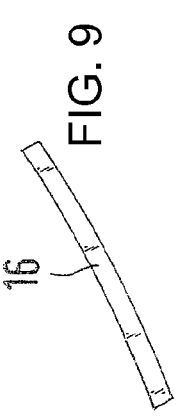
Figure 6:
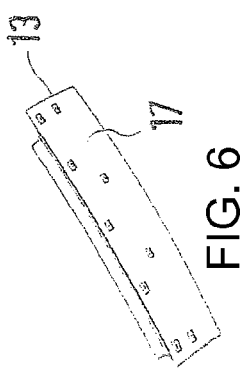
FIG. 6 is a diagrammatic, perspective view of a panel carrier of the panel device.

The variant shown in FIG. 5 has precisely two panel bodies 15, 16. It is clear that, in principle, three or more panel bodies may also be provided. The two panel bodies 15, 16 extend in each case over the entire width of the rear lid or tailgate 1 and, accordingly, are disposed adjacent to each other in the longitudinal direction 5 of the vehicle. FIG. 8 shows the panel body 15 which, in the fitted state, is directly adjacent to the spoiler device 2 while FIG. 9 shows the panel body 16 which is disposed at a distance from the spoiler device 2. The panel body 16 may be, for example, a luminous band which, for example, is configured to be reflective.

In the same manner as the panel carrier 13, the panel bodies 14, 15, 16 may be produced from plastic. The spoiler device 2 may also be produced from plastic.

Figure 10:
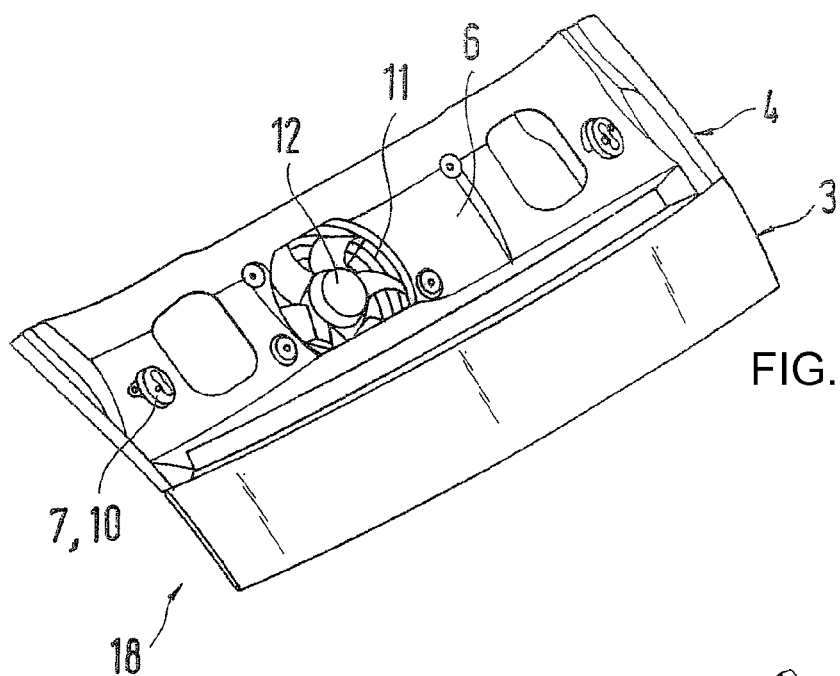
FIG. 10 is a diagrammatic, perspective view as in FIG. 2.
Figure 11:
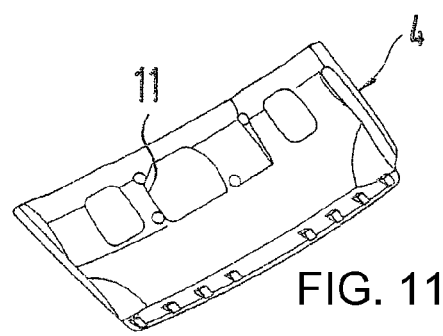
FIG. 11 is a diagrammatic, perspective view of an assembly carrier.
Figure 12:
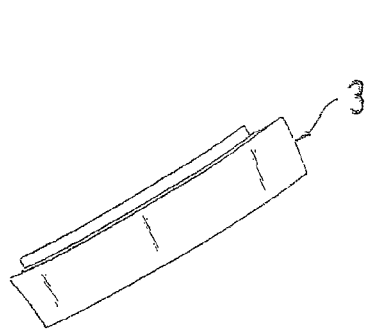
FIG. 12 is a diagrammatic, perspective view of the panel device.
Figure 13:
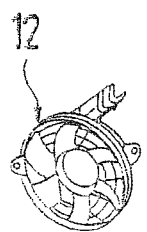
FIG. 13 is a diagrammatic, perspective view of a fan.

In the same manner as FIG. 2, FIG. 10 shows the assembly carrier 4 in a preassembled state with the spoiler device 2 missing. In the assembly state, the assembly carrier 4 together with the components attached thereto forms a preassembled unit 18 which can be fitted in its entirety to the vehicle body. In order to produce the unit 18, the assembly carrier 4 according to FIG. 11 is equipped with the individual components which are reproduced by way of example in FIGS. 12 to 14. The assembly carrier 4 according to FIG. 11 is therefore provided with the panel device 3 which is shown in FIG. 12 and, for its part, can form a preassemblable unit. Furthermore, the fan 12 according to FIG. 13 can also be fastened to the assembly carrier 4. Furthermore, the adjustment device 7 shown in FIG. 14 can be attached to the assembly carrier 4. Moreover, a non-illustrated locking clamp can be attached to the assembly carrier 4 and can be used to lock the tailgate 1 to the vehicle body in the closed position. In addition, the hinges already mentioned further above can be attached to the assembly carrier 4 and are used to mount the tailgate 1 pivotably on the vehicle body.

When the tailgate 1 presented here is used, the vehicle to be equipped therewith can preferably be produced as follows. First of all, the unit 18 which generally contains the entire tailgate 1 without the spoiler device 2 is preassembled. The preassembled unit 18 is subsequently fitted on the vehicle which has already been painted previously or on the vehicle body which has been painted in advance. The spoiler device 2 is subsequently fitted to the assembly carrier 4 which is already fitted on the vehicle.

It is likewise possible to preassemble the spoiler device 2 on the unit 18 and then to fit the complete rear lid to the painted vehicle.

Painting of the tailgate 1 or of part of the tailgate 1 together with the vehicle body is not required. It is clear that those components of the tailgate which form the outer side of the tailgate 1, i.e. the spoiler device 2 and the panel device 3 or at least one of the panel bodies 14 or 15, can likewise be painted in the color of the vehicle.

The invention claimed is:

1. A rear lid for closing a rear compartment of a passenger vehicle, the rear lid, when fitted, being attached to the passenger vehicle, the rear lid comprising:
    an inner part being an assembly carrier forming a supporting structure of the rear lid;
    an adjustment device fastened to said assembly carrier;
    an outer part having a panel device and a spoiler device, said spoiler being displaced by said adjustment device between an inoperative position and an operative position; and
    a fan directly fastened to said assembly carrier.

2. The rear lid according to claim 1, wherein said spoiler device and said panel device each extend over an entire width of the rear lid, as measured transversely with respect to a longitudinal direction of the passenger vehicle, and said panel device is disposed adjacent to said spoiler device on said assembly carrier.

3. A rear lid for closing a rear compartment of a passenger vehicle, the rear lid, when fitted, being attached to the passenger vehicle, the rear lid comprising:
    an inner part being an assembly carrier forming a supporting structure of the rear lid;
    an adjustment device fastened to said assembly carrier; and
    an outer part having a panel device and a spoiler device, said spoiler being displaced by said adjustment device between an inoperative position and an operative position, said panel device having a panel carrier fastened to an outside of said assembly carrier, and at least one panel body fastened to an outer side of said panel carrier, said outer side facing away from said assembly carrier.

4. The rear lid according to claim 3, wherein said panel body of said panel device is a single panel body covering said outer side of said panel carrier.

5. The rear lid according to claim 4, wherein said single panel body extends over the entire width of the rear lid.

6. The rear lid according to claim 3, wherein said panel body of said panel device has at least two panel bodies covering said outer side of said panel carrier, said at least two panel bodies are adjacent to each other in the longitudinal direction of the passenger vehicle.

7. The rear lid according to claim 6, wherein at least one of said panel bodies is configured as a luminous band.

8. The rear lid according to claim 6, wherein said panel bodies extends over the entire width of the rear lid.

9. The rear lid according to claim 1, wherein said adjustment device is directly fastened to said assembly carrier.

10. The rear lid according to claim 1, wherein said assembly carrier is a single-piece diecast part made from a metal alloy.

11. The rear lid according to claim 10, wherein said metal alloy is selected from the group consisting of aluminum and magnesium alloy.

12. A method for producing a passenger vehicle with a tailgate, which comprises the steps of:
    preassembling an adjustment device on an assembly carrier resulting in a preassembled assembly carrier;
    fitting the preassembled assembly carrier to a painted vehicle body; and
    fitting a spoiler device to the preassembled assembly carrier fitted to the painted vehicle body.

13. The method according to claim 12, which further comprises during the preassembling of the assembly carrier step, fitting at least one of a panel device, a panel carrier, panel bodies, and a fan to the assembly carrier.

* * * * *